No. 865,633. PATENTED SEPT. 10, 1907.
S. G. DAVIS.
TIRE.
APPLICATION FILED NOV. 5, 1906.
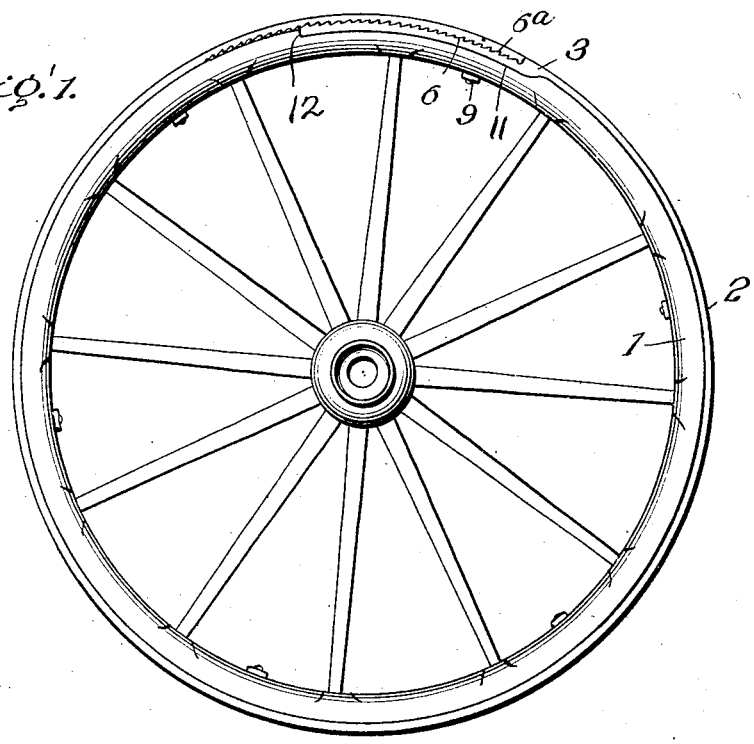
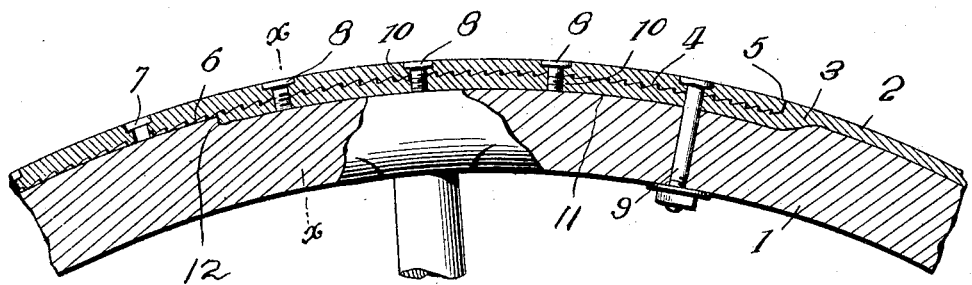
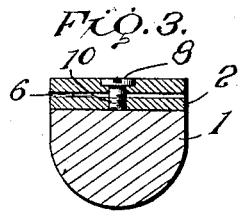
Witnesses
Inventor
Stephen G. Davis,
Attorneys

UNITED STATES PATENT OFFICE.

STEPHEN G. DAVIS, OF COOPER, IOWA.

TIRE.

No. 865,633.  Specification of Letters Patent.  Patented Sept. 10, 1907.

Application filed November 5, 1906. Serial No. 342,130.

*To all whom it may concern:*

Be it known that I, STEPHEN G. DAVIS, a citizen of the United States, residing at Cooper, in the county of Greene and State of Iowa, have invented certain new and useful Improvements in Tires, of which the following is a specification.

The object of my invention is to provide an improved construction of vehicle tire which is so arranged that the tire may be conveniently tightened whenever it is necessary, owing to its becoming loose by the shrinking of the wheel or the like, and without the necessity of the services of an expert blacksmith or wheelwright, thereby resulting in economic advantages.

For a full understanding of the invention and the merits thereof and also to acquire a knowledge of the details of construction of the means for effecting the result, reference is to be had to the following description and accompanying drawings, in which:

Figure 1 is a side elevation of the wheel showing my improved tire applied thereto. Fig. 2 is a longitudinal sectional view of a portion of the wheel rim. Fig. 3 is a transverse section taken approximately on the line X—X of Fig. 2.

Corresponding and like parts are referred to in the following description and indicated in all the views of the drawings by the same reference characters.

Referring to the drawing, the numeral 1 designates the felly of a wheel, and 2 my improved tire. The tire 2 is in the form of a split band of iron or steel, and said band is thickened at one end, as indicated at 3, and is provided beyond said thickened portion with a cut away portion or recess 4 on its outer face, the inner end of said recess producing a shoulder 5. The cut away portion 4 of one end of the tire is designed to be overlapped by and receive the other end of the tire, and the cut away portion or recess 4 is of such a depth in the thickened portion 3 of the tire that when the two ends are overlapped, the outer circumference of the tire will be practically circular.

The end of the tire 2 beyond the shoulder 5 is provided on its outer face with a series of transverse notches 6 that are designed to coact with similar notches 6ª on the other end of the tire, said two sets of notches being beveled so that the ends of the tire may be drawn together or compressed circumferentially, with one end sliding over the other end as indicated, and without the notches injuring the portions of the felly over which they slide to secure this action. The two overlapping ends of the tire engage each other by means of the interlocking notches, and to secure these ends firmly in place at their adjusted positions, I employ clamps extending through apertures 7 of the ends of the tire. Any number of these clamps may be employed, and in the present instance I have shown two forms of clamps, one of which designated 8 extends merely through the two overlapping ends of the tire, while the other clamp designated 9, extends not only through the two overlapping ends, but also through one section of the felly so as to secure the two ends firmly to the rim of the wheel. This clamp 9 may be provided at its inner projecting end with a nut. If desired, the apertures in the overlapped end of the tire may be provided with screw threads 10 so that the clamps 8 may be in the form of screw bolts.

In the practical use of my improved tire, whenever it is necessary to set the tire, owing to its becoming loose by the shrinking of the rim or the like, the tire is set back on the rim and an amount of metal is cut off from the overlapping end of the tire equal to the distance it is desired to take up the latter. The tire is then compressed circumferentially by any suitable tools and the two ends are clamped together by the clamps 8 and 9, and also fastened to the felly of the tire in the tightened condition. The holes or apertures 7 in the two ends of the tire are so arranged at equal distances apart that they will register so as to receive the clamps when the tire has been tightened or adjusted.

Preferably, that section of the felly 1 to which the overlapping ends of the tire are secured, is provided with a recess 11 on its outer face which corresponds at one end to the inwardly enlarged or thickened portion 3 of the tire, and which snugly receives the overlapped end of the tire, the one end of said recess 11 producing a shoulder 12 against which the overlapping end of the tire abuts as clearly illustrated in the drawings.

Having thus described the invention, what is claimed as new is:

The combination of a wheel embodying a felly having a recess formed in the periphery thereof, one end of said recess terminating in a shoulder, a tire in the form of a split band encircling said felly, one end of the said band being thickened and fitting within the before mentioned recess in the felly so as to abut against the shoulder at the termination of the recess, the said thickened portion of the band being provided with a recess and with a plurality of transverse beveled notches on its outer face, the opposite end of the tire being designed to fit within the recess of the first mentioned end and provided with transverse notches for coacting with the first mentioned notches, the end portions of the band being provided with corresponding openings, a series of clamping screws passing through a portion of the corresponding openings and holding the overlapping ends of the band together, and a clamping bolt extending through the overlapping ends of the band and the felly of the wheel.

In testimony whereof I affix my signature in presence of two witnesses.

STEPHEN G. DAVIS. [L. S.]

Witnesses:
 WALTER SMITH,
 H. J. HOHANSHELT.